(12) United States Patent
Hsu et al.

(10) Patent No.: US 11,172,282 B2
(45) Date of Patent: Nov. 9, 2021

(54) EARPHONE AND EARPHONE WEARING DETECTION METHOD

(71) Applicant: ITE Tech. Inc., Hsinchu (TW)

(72) Inventors: Chia-Shen Hsu, Hsinchu (TW);
Ping-Yuan Wang, Changhua County (TW)

(73) Assignee: ITE Tech. Inc., Hsinchu (TW)

(*) Notice: Subject to any disclaimer, the term of this patent is extended or adjusted under 35 U.S.C. 154(b) by 0 days.

(21) Appl. No.: 16/986,233

(22) Filed: Aug. 5, 2020

(65) Prior Publication Data
US 2021/0044886 A1 Feb. 11, 2021

(30) Foreign Application Priority Data

Aug. 8, 2019 (TW) .................................. 108128201
Jul. 6, 2020 (TW) .................................. 109122752

(51) Int. Cl.
*H04R 1/10* (2006.01)
*G06F 3/044* (2006.01)
*G06F 3/16* (2006.01)

(52) U.S. Cl.
CPC .......... *H04R 1/1041* (2013.01); *G06F 3/044* (2013.01); *G06F 3/165* (2013.01); *H04R 1/1016* (2013.01);
(Continued)

(58) Field of Classification Search
CPC .. H04R 1/1041; H04R 2420/07; H04R 5/033; H04R 1/1058; H04R 19/005; H04R 19/02; H04R 1/1016; H04R 1/1091; H04R 2201/401; H04R 2225/025; H04R 2400/01; H04R 5/02; H04R 5/027; H04R 19/00; H04R 1/1008; H04R 1/1083; H04R 25/505; H04R 25/554; H04R 31/00; H04R 1/1066; H04R 2201/10; H04R 2201/107; H04R 2420/09; H04R 2460/07; H04R 3/04; H04R 5/0335; H04R 5/04; H04R 1/1075; H04R 2201/003; H04R 2460/03; H04R 2499/15; H04R 29/001; H04R 31/003;
(Continued)

(56) References Cited

U.S. PATENT DOCUMENTS 8,824,712 B2* 9/2014 Sacha .................... H04R 25/50
381/321
9,723,416 B2* 8/2017 Babico ................... H04R 25/65
(Continued)

FOREIGN PATENT DOCUMENTS

CN 209017261 * 6/2019 .............. H04R 1/10
CN 209017261 U 6/2019
(Continued)

*Primary Examiner* — Lun-See Lao
(74) *Attorney, Agent, or Firm* — Winston Hsu

(57) ABSTRACT

An earphone has a housing, a sound output hole, a first touch sensor, a second touch, a third touch sensor, and a microprocessor. The microprocessor is coupled to the first touch sensor, the second touch sensor and the third touch sensor for determining whether the earphone is worn on an ear according to the sensing result of the first touch sensor, determining whether the earphone is held in hand according to the sensing result of the second touch sensor, and providing a corresponding control function according to the sensing result of the third touch sensor.

20 Claims, 14 Drawing Sheets

(52) U.S. Cl.
CPC ....... *H04R 1/1058* (2013.01); *H04R 2420/07* (2013.01)

(58) Field of Classification Search
CPC . H04L 65/1059; H04L 65/4069; H04L 65/60; H04L 65/604; H04L 65/80; H04L 41/0816; H04L 43/16; H04L 61/1582; H04L 63/083; H04L 65/00; H04L 65/1069; H04L 65/4076; H04L 65/4084; H04L 65/4092; H04L 67/38; H04L 67/08; H04L 67/1095; H04W 4/80; H04W 12/06; H04W 4/023; H04W 52/027; H04W 64/006; H04W 68/04; H04W 4/02; H04W 4/027; H04W 4/029; H04W 4/90; H04B 7/24; H04B 17/318; H04B 1/385; H04B 5/0006; H04B 5/02; H04N 21/4126; H04N 21/41265; H04N 21/4183; H04N 21/42204; H04N 21/4222; H04N 21/42224; H04N 21/4621; H04N 21/47; H04N 21/4884; H04N 21/2665; H04N 21/2668; H04N 21/414; H04N 21/43615; H04N 21/4383; H04N 21/4823; H04N 21/8586; G10K 11/175; H04H 20/00; H04H 20/82; H04H 60/43; H04M 1/0283; H04M 1/6041; H04M 1/6066; H04M 1/72454; H04M 2250/02; H04M 2250/22; H04M 1/05; H04M 1/72418; H04M 1/72448; H04M 1/725; H04M 2250/12; H04S 5/00
USPC .............. 381/74, 1–3, 323; 455/550.1, 575.1
See application file for complete search history.

(56) References Cited

U.S. PATENT DOCUMENTS

| | | | | |
|---|---|---|---|---|
| 10,516,929 | B2 * | 12/2019 | Maguire | G01R 33/0017 |
| 10,536,191 | B1 * | 1/2020 | De Laurentiis | H04R 1/1091 |
| 2011/0235833 | A1 * | 9/2011 | Hensen | H04R 5/033 |
| | | | | 381/311 |
| 2018/0039086 | A1 * | 2/2018 | Jiang | H04R 1/1041 |

FOREIGN PATENT DOCUMENTS

| | | | | |
|---|---|---|---|---|
| CN | 209134600 | U | 7/2019 | |
| CN | 209134600 | * | 9/2019 | ............... H04R 1/10 |

* cited by examiner

US 11,172,282 B2

EARPHONE AND EARPHONE WEARING DETECTION METHOD

CROSS REFERENCE TO RELATED APPLICATION

This application claims the benefit of Taiwan application No. 108128201 filed on Aug. 8, 2019, and Taiwan application No. 109122752 filed on Jul. 6, 2020, the contents of which are incorporated herein by reference.

BACKGROUND OF THE INVENTION

1. Field of the Invention

The present invention relates to an earphone, in particular to a method for judging whether the earphone is worn on an ear using capacitive touch sensors.

2. Description of the Prior Art

With the development of digitization of music files, the use of earphone in people's lives has become more and more common. Earphone provides people with more convenient use when listening to music for business, leisure and entertainment, travel, fitness, etc. Therefore, Bluetooth earphone and binaural wireless earphone are gradually emerging, with more and more functions and smaller size. However, when the user wants to control the function of playing, pausing or selecting music, he or she must pick up the music player of the Walkman or the mobile phone to select the button. Or when the earphone works with the mobile phone, in addition to controlling music playback and pause, call-type functions such as answering or hanging up must also be added. Therefore, more convenient earphones with touch function and wearing detection function came into being.

Currently, an earphone with a wearing detection function usually uses infrared rays for in-ear detection. To achieve this function, a dedicated chip is required to process infrared signals. The volume of the element for transmitting and receiving infrared rays will also cause restrictions on the design of the earphone shell, which cannot make the earphones further miniaturized, and it needs to dig a hole in the earphone shell for installing the infrared detector, increasing the chance of dust and moisture, and cannot be integrated. In addition, the infrared in-ear detector is very sensitive to changes in ambient light, and it is easy to misjudge the in-ear detection function due to the intensity of external light. The earphone shell cannot use light-permeable materials, which limits the product design.

SUMMARY OF THE INVENTION

An embodiment of the present invention discloses an earphone, which comprises a housing, a sound output hole, a first touch sensor, a second touch sensor, a third touch sensor and a microprocessor. The sound output hole is formed on an inner exposed side of the housing. The first touch sensor is installed on the inner exposed side of the housing. The second touch sensor is installed on a first portion of an edge of the inner exposed side of the housing. The third touch sensor is installed on an outer exposed side of the housing. The microprocessor is coupled to the first touch sensor, the second touch sensor and the third touch sensor. The microprocessor is configured to determine whether the earphone is worn on an ear at least according to a sensing result of the first touch sensor, determine whether the earphone is held in hand according to a sensing result of the second touch sensor, and provide a corresponding control function according to a sensing result of the third touch sensor.

Another embodiment of the present invention discloses an earphone wearing detection method, which comprises: when an earphone is powered on, periodically detecting variations of electric fields of a first touch sensor, a second touch sensor, and a third touch sensor of the earphone; when a variation of the electric field of the first touch sensor exceeds a first threshold, the first touch sensor performing a first touch sensing counting; when a variation of the electric field of the second touch sensor is less than a second threshold, and a count value of the first touch sensing counting is greater than a first predetermined value, determining that the earphone is worn on an ear; when it is determined that the earphone is worn on the ear, turning on the third touch sensor; and providing a corresponding control function according to a sensing result of the third touch sensor.

Another embodiment of the present invention discloses an earphone wearing detection method, which comprises: when an earphone is powered on, periodically detecting variations of electric fields of a first touch sensor, a second touch sensor, a third touch sensor, and a fourth touch sensor of the earphone; when a variation of the electric field of the first touch sensor exceeds a first threshold, the first touch sensor performing a first touch sensing counting; when a variation of the electric field of the fourth touch sensor exceeds a fourth threshold, the fourth touch sensor performing a fourth touch sensing counting; when a variation of the electric field of the second touch sensor is less than a second threshold, a count value of the first touch sensing counting is greater than a first predetermined value, and a count value of the fourth touch sensing counting is greater than a fourth predetermined value, determining that the earphone is worn on an ear; when it is determined that the earphone is worn on the ear, turning on the third touch sensor; and providing a corresponding control function according to the sensing result of the third touch sensor.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
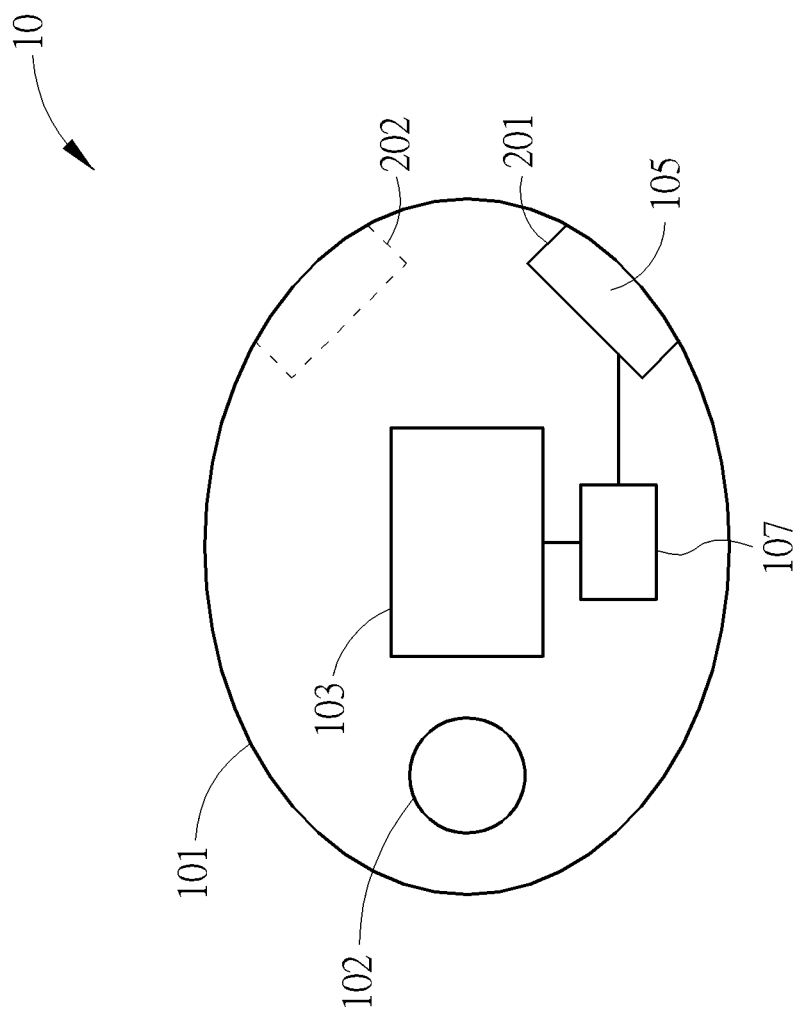
FIG. 1 is a schematic diagram of an inner exposed side of an earphone according to an embodiment of the invention.
Figure 2:
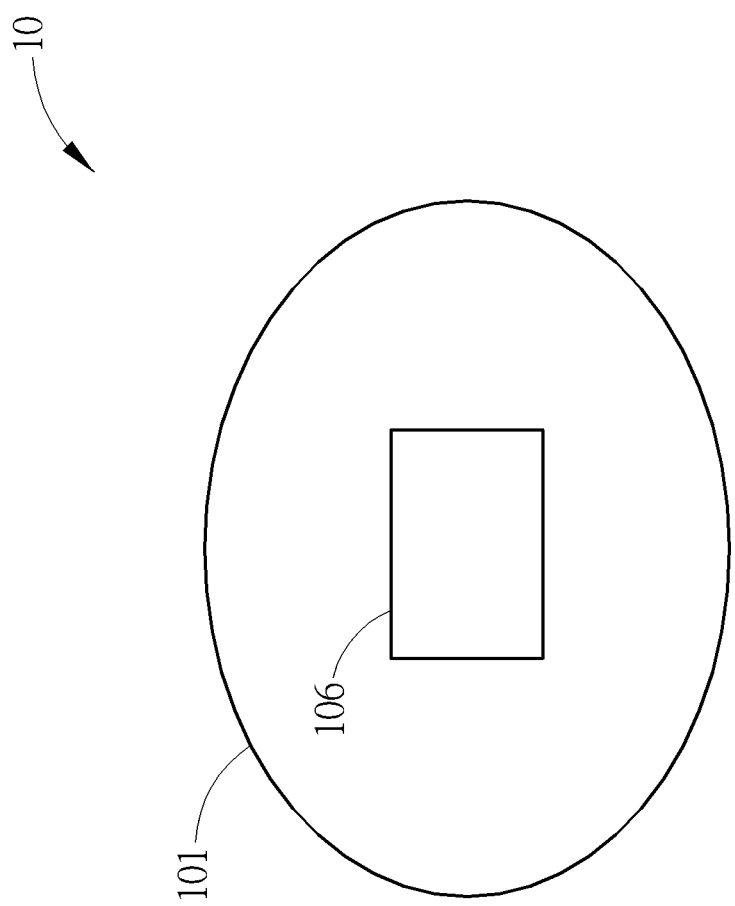
FIG. 2 is a schematic diagram of an outer exposed side of the earphone in FIG. 1.
Figure 3:
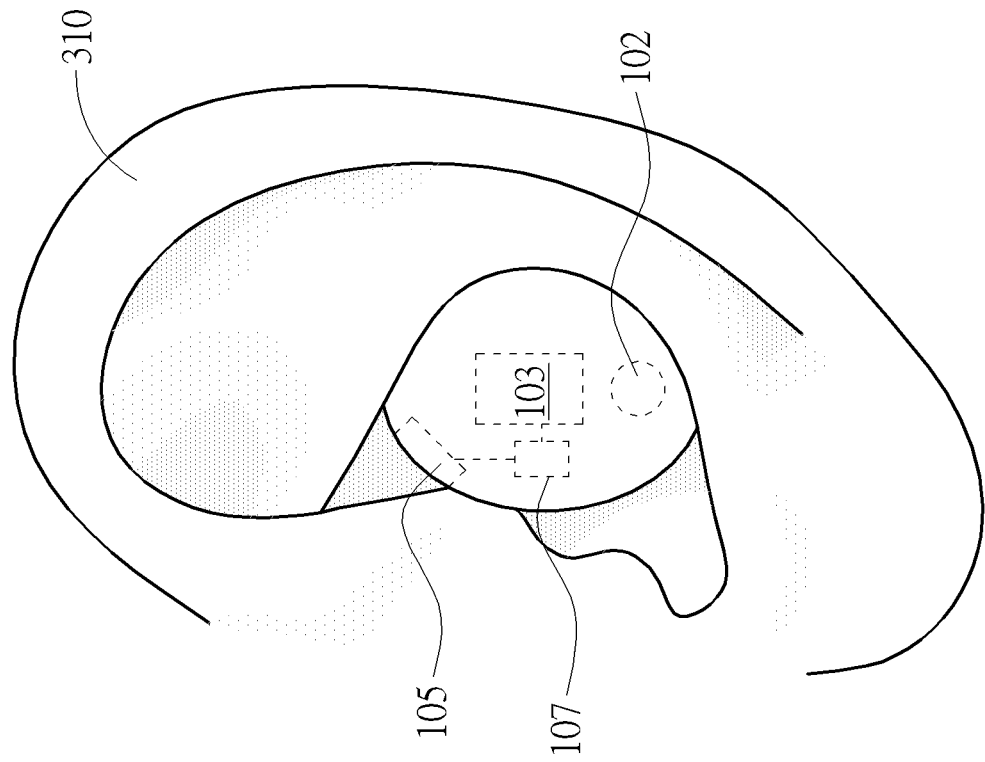
FIG. 3 is a schematic diagram of the earphone shown in FIG. 1 when it is worn on the left ear.

FIG. 1 is a schematic diagram of an inner exposed side of an earphone 10 according to an embodiment of the present invention, FIG. 2 is a schematic diagram of an outer exposed side of earphone 10, and FIG. 3 is a schematic diagram of earphone 10 when it is worn on a left ear 310. In order to show clearly the contact points between the left ear 310 and the touch sensors installed on the inner exposed side of the earphone 10, the earphone 10 in FIG. 3 is shown in a perspective view. The earphone 10 comprises a housing 101, a sound output hole 102, a first touch sensor 103, a second touch sensor 105, a third touch sensor 106, and a microprocessor 107. The sound output hole 102 and the first touch sensor 103 are installed on the inner exposed side of the housing 101, the second touch sensor 105 is installed on the first portion 201 of the edge of the inner exposed side of the housing 101, and the third touch sensor 106 is installed on the outer exposed side of the housing 101. The function of the sound output hole 102 is that when sound is produced by an utterance unit in the earphone 10, the sound can be transmitted to the left ear 310 through the sound output hole 102. The microprocessor 107 is coupled to the first touch sensor 103, the second touch sensor 105 and the third touch sensor 106, and the microprocessor 107 is used to determine whether the earphone 10 is worn on the left ear 310 according to the sensing result of the first touch sensor 103, to determine whether the earphone 10 is held in hand according to the sensing result of the second touch sensor 105, and provide a corresponding control function according to the sensing result of the third touch sensor 106.

In one embodiment, the first touch sensor 103, the second touch sensor 105, and the third touch sensor 10 may all be capacitive touch sensors. Compared with the infrared transceiver, since the present invention uses capacitive touch sensors to determine whether the earphone 10 is worn on the left ear 310, the present invention has the advantage of not having to dig holes in the earphone shell, and the earphone 10 would be protected from invading dust and moisture. In addition, infrared in-ear detectors are very sensitive to changes in ambient light, and are prone to misjudgment in-ear detection due to the ambient light. Since the present invention uses a touch sensor, the shell of the earphone may be made of light-transmissive materials, so more materials could be used in the shell of the earphone of the present invention than the earphone that uses an infrared detector.

In an embodiment, each touch sensor may have a threshold and a predetermined value. When a variation of the electric field of a touch sensor exceeds the threshold of the touch sensor, the touch sensor starts performing a touch sensing counting, and determines whether a count value of the touch sensing counting exceeds the predetermined value. For example, when the user's finger approaches or touches the touch sensor, it is determined whether the earphone is touched by the finger based on whether the variation of the induced electric field of the touch sensor exceeds the threshold. The predetermined value is used to determine the user's accidental touch behavior. When a count value of the touch sensing counting of the touch sensor exceeds the predetermined value, it means that the user did not accidentally touch the touch sensor. In the embodiment, the first touch sensor 103 may store a first threshold and a first predetermined value, and the second touch sensor 105 may store a second threshold and a second predetermined value. Each of the first predetermined value and the second predetermined value may correspond to a predetermined length of time respectively, and the unit of the first predetermined value and the second predetermined value may be seconds. When the count value of the touch sensing counting of the first touch sensor 103 exceeds the first predetermined value, it means that the first touch sensor 103 has been continuously touched for more than a first predetermined time. Similarly, when the count value of the touch sensing counting of the second touch sensor 105 exceeds the second predetermined value, it means that the time that the second touch sensor 105 is continuously touched exceeds a second predetermined time.

In one embodiment, the first touch sensor 103 would be used for in-ear detection of the earphone 10, and the second touch sensor 105 would be used for hand-held detection of the earphone 10. As shown in FIG. 3, when the earphone 10 is worn on the left ear 310, the first touch sensor 103 is located on the inner exposed side of the housing 101 of the earphone 10, and should be in contact with the left ear 310; and the second touch sensor 105 should not be in contact with the left ear 310 because there is still a distance from the left ear 310. Therefore, the microprocessor 107 would determine whether the earphone 10 is worn on the left ear 310 according to the sensing results of the first touch sensor 103 and the second touch sensor 105.

Furthermore, when the variation of the electric field of the first touch sensor 103 exceeds the first threshold, the first touch sensor 103 would perform a first touch sensing counting. When the variation of the electric field of the second touch sensor 105 is less than the second threshold and a count value of the first touch sensing counting is greater than the first predetermined value, the microprocessor 107 would determine that the earphone 10 is worn on the left ear 310.

In one embodiment, when the variation of the electric field of the second touch sensor 105 exceeds the second threshold, the second touch sensor 105 can perform a second touch sensing counting. When a count value of the second touch sensing counting is greater than the second predetermined value, the microprocessor 107 would determine that the earphone 10 is held in hand. Since the second touch sensor 105 would be touched when the earphone 10 is worn on the left ear 310 or when the earphone 10 is taken out from the left ear 310, the second touch sensor 105 can be used to determine whether the earphone 10 is held in hand. In addition, as shown in FIG. 1, when trying to hold the earphone 10 by hand, if the first touch sensor 103 is clamped by the fingers, the earphone 10 will not only be difficult to hold, but will even slide upward.

Figure 4:
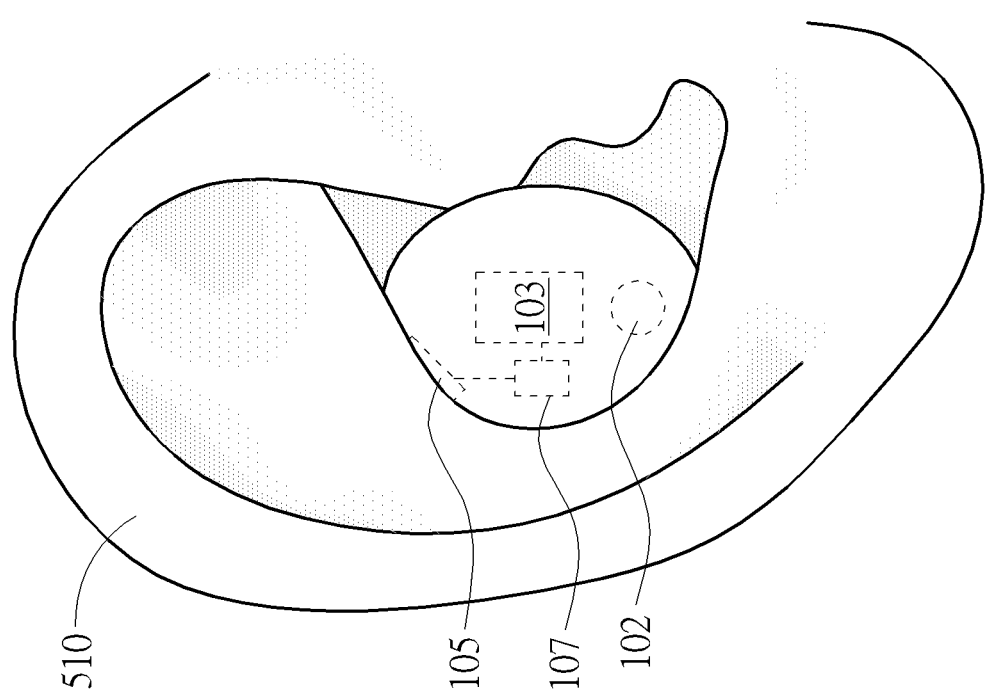
FIG. 4 is a schematic diagram of the earphone shown in FIG. 1 when it is worn on the right ear.

As shown in FIG. 4, when the earphone 10 is worn on the right ear 510, since the first touch sensor 103 and the second touch sensor 105 are always in contact with the right ear 510, the microprocessor 107 can determine that the earphone 10 is worn on the right ear 510. This is different from when the earphone 10 is worn on the left ear 310, the first touch sensor 103 will contact the left ear 310 but the second touch sensor 105 will not contact the left ear 310. Therefore, the microprocessor 107 would determine whether the earphone 10 is worn on the left ear 310 or the right ear 510 according to the sensing results of the first touch sensor 103 and the second touch sensor 105. In one embodiment, earphone 10 is designed to be dedicated to left ear 310, and when microprocessor 107 determines that earphone 10 is worn on the right ear 510 based on the sensing results of first touch sensor 103 and second touch sensor 105, the microprocessor 107 can emit a prompt sound through the utterance unit of the earphone 10 to remind the user that earphone 10 has been worn on the right ear 510 by mistake, and earphone 10 should be worn on the left ear 310 instead.

In addition, when the microprocessor 107 determines that the earphone 10 is worn on the left ear 310, the microprocessor 107 turns on the third touch sensor 106. Since most earphones today are wireless earphones, and a miniaturized battery is often attached therein in pursuit of convenience and miniaturization. Due to the limited power storage capacity of the battery of the earphone 10, the management of battery power consumption is also relatively important. When the earphone 10 is turned on, the microprocessor 107 would periodically detect the first touch sensor 103 and the second touch sensor 105 only. As for the activation of other functions, such as the third touch sensor 106 and the power-consuming utterance unit of the earphone, electric power would not supply to the third touch sensor 106 and the power-consuming utterance unit until the earphone 10 is worn on the left ear 310. Therefore, the earphone 10 would more effectively save battery power consumption. For example, when the earphone 10 is a Bluetooth earphone, since the third touch sensor 106 is not turned on before the earphone 10 is worn on the ear, the battery power consumption would be reduced and the use time of the earphone 10 would be extended.

As shown in FIG. 2, the third touch sensor 106 is installed on the outer exposed side of the housing 101, and provides corresponding control functions, such as controlling volume of the earphone 10, playing music, selecting a music track, pausing, answering an incoming call and hanging up a call. Since the third touch sensor 106 is turned on only when it is determined that the earphone 10 is worn on the left ear 310, power consumption would be saved. The touch sensing of the third touch sensor 106 and the corresponding control signal can be preset. For example, long press, two short presses, up press and down press respectively represent answering the call, pause playback, track selection and volume control. Therefore, with the third touch sensor 106, users would use earphone 10 more conveniently.

In addition to being an in-ear earphone, the earphone 10 may also be a head-worn earphone. When the earphone 10 is a head-worn earphone, in order to make the earphone 10 still have the above-mentioned function of judging whether it is worn on the ear or whether it is hand-held, the positions of the first touch sensor 103 and the second touch sensor 105 could be adjusted so that the first touch sensor 103 can touch the left ear 310 and the second touch sensor 105 would not touch the left ear 310 when the earphone 10 is worn on the left ear 310, and the second touch sensor 105 is installed at a position to make the second touch sensor 105 touchable by the user when the earphone 10 is held in hand.

Figure 5:
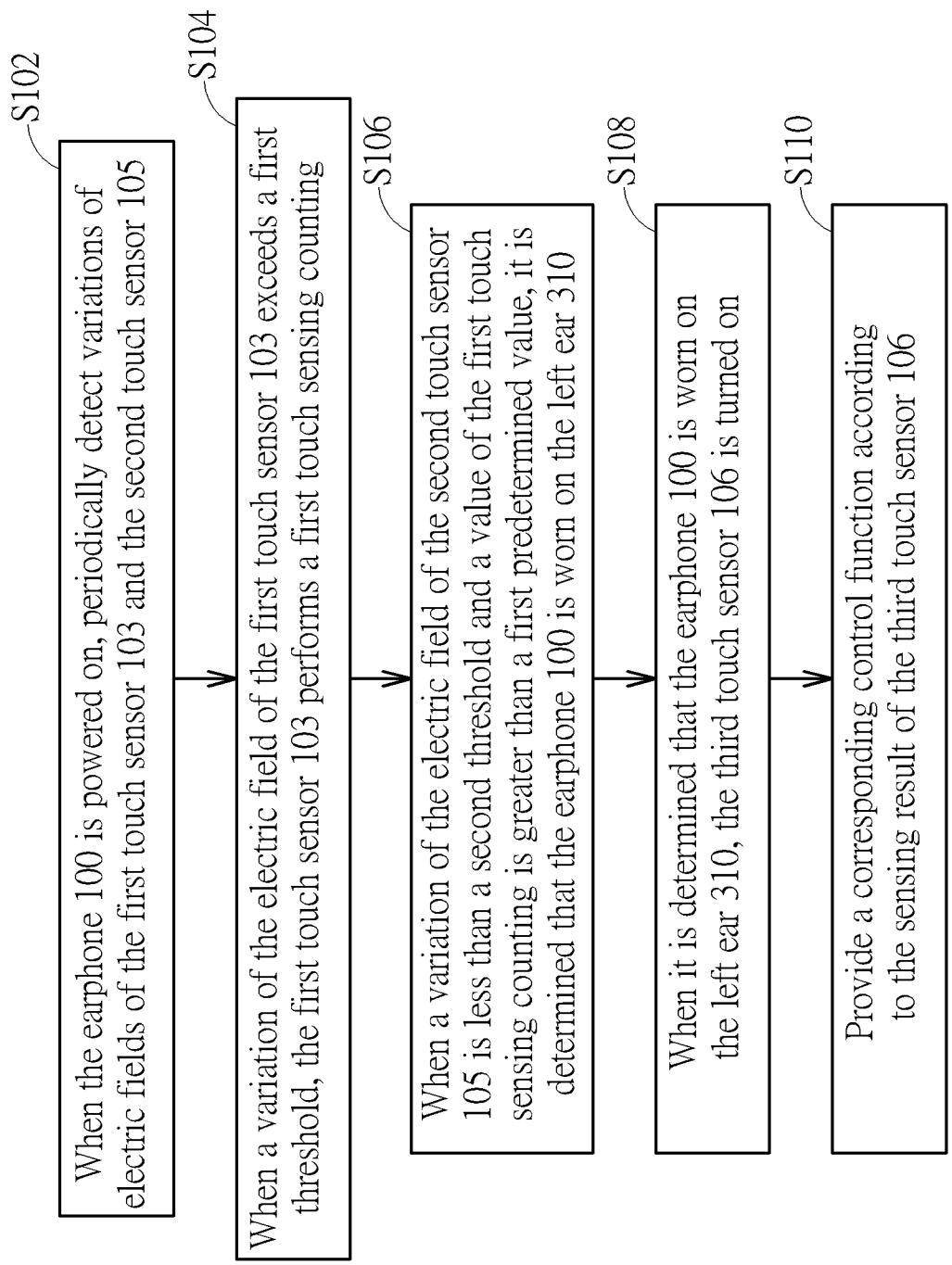
FIG. 5 is a flowchart of a method for detecting the earphone shown in FIG. 1 worn on the left ear.

FIG. 5 is a flowchart of a method for detecting the earphone 10 worn on the left ear 310. The method shown in FIG. 5 comprises the following steps:

Step S102: When the earphone 10 is powered on, periodically detect the variations of the electric fields of the first touch sensor 103 and the second touch sensor 105;

Step S104: When the variation of the electric field of the first touch sensor 103 exceeds the first threshold, the first touch sensor 103 performs the first touch sensing counting;

Step S106: When the variation of the electric field of the second touch sensor 105 is less than the second threshold, and a count value of the first touch sensing counting is greater than the first predetermined value, it is determined that the earphone 10 is worn on the left ear 310;

Step S108: When it is determined that the earphone 10 is worn on the left ear 310, turn on the third touch sensor 106; and Step S110: Provide a corresponding control function according to the sensing result of the third touch sensor 106.

In step S102, when the earphone 10 is powered on, in order to achieve the best battery power consumption management, only the variations of the electric fields of the first touch sensor 103 and the second touch sensor 105 are periodically detected. Only when it is determined that the earphone 10 is worn on the left ear 310, the other components of earphone 10 are turned on. In step S104, when the first touch sensor 103 performs the first touch sensing counting, if the variation of the electric field of the first touch sensor 103 is less than the first threshold at this time, the first touch sensing counting of the first touch sensor 103 is stopped and reset.

Step S102 is a main step of determining whether the earphone 10 is held in hand or worn on the left ear 310. The first touch sensor 103 is used for in-ear detection, and the second touch sensor 105 is used for hand-held detection. As shown in FIG. 3, when the earphone 10 is worn on the left ear, due to the shape of the left ear 310, the second touch sensor 105 still has a distance from and will not be in direct contact the left ear 310 after the earphone 10 is worn on the left ear 310. In one embodiment, each touch sensor would have a threshold and predetermined value. As described in step S402, when the variation of the electric field of the first touch sensor 103 exceeds a first threshold, it means that the earphone 10 may have been worn on the left ear 310 and touched the left ear 310. In addition, in order to determine whether the touch is a false touch, it would be further determined whether the count value of the first touch sensing counting is greater than the first predetermined value. In addition, the microprocessor 107 would determine whether the second touch sensor 105 has a contact signal. Because when the earphone 10 is worn on the left ear 310, as shown in FIG. 3, the second touch sensor 105 should not be in contact with the left ear 310. Therefore, the variation of the electric field of the second touch sensor 105 should be less than the second threshold. After the above condition determination, it can be determined whether the earphone 10 satisfies the state of being worn on the left ear 310.

In step S108, when it is determined that the earphone 10 is worn on the left ear 310, the third touch sensor 106 is turned on. The third touch sensor 106 is located on the outer exposed side of the earphone 10, and is used to provide different functions of the earphone 10 such as volume control, music playback, track selection, pause, answering and/or hanging up calls. In addition, when it is determined that the earphone 10 is worn on the left ear 310, the earphone 10 starts to provide electric power to at least one utterance unit of the earphone 10, that is, to turn on the sound function of the earphone 10. Since the utterance unit is a relatively large power consumption unit in the earphone 10, it is particularly important in a wireless earphone. This kind of control method can more effectively reduce battery power consumption.

Figure 6:
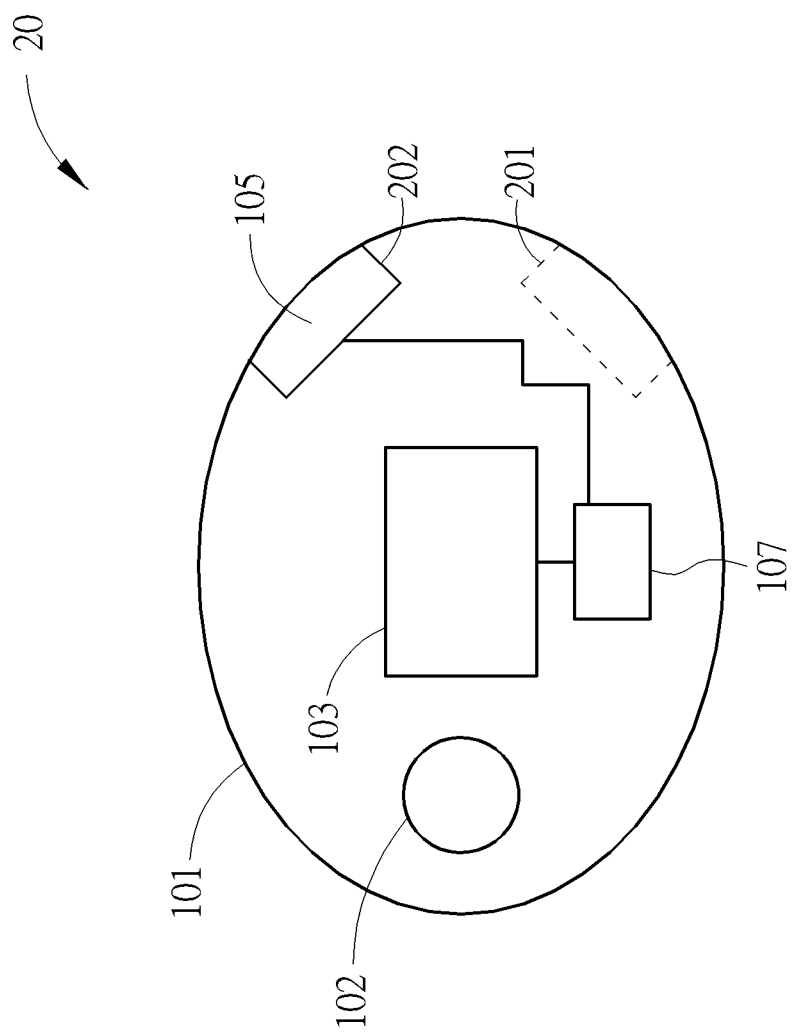
FIG. 6 is a schematic diagram of the inner exposed side of an earphone according to another embodiment of the present invention.

In the above steps, the method further comprises determining that the earphone 10 is held in hand when the variation of the electric field of the second touch sensor 105 exceeds the second threshold and the count value of the second touch sensing counting is greater than the second predetermined value. For example, when the user takes off the earphone 10, because the user's finger touches the second touch sensor 105, the variation of the electric field of the second touch sensor 105 will exceed the second threshold and trigger the second touch sensor 105 to start the second touch sensing counting. If the count value of the second touch sensing counting is greater than the second predetermined value, and the microprocessor 107 would stop the utterance unit from playing music without the user being distracted by handling the music playing. Therefore, it can save power consumption In one embodiment, there is another earphone 20 designed to be dedicated to the right ear 510, as shown in FIG. 6. The difference between earphone 20 and earphone 10 is only the setting position of the second touch sensor 105. The second touch sensor 105 of earphone 20 is installed on a second portion 202 of the edge of the inner exposed side of the housing 101, and the second touch sensor 105 of earphone 10 is installed on the first portion 201 of the edge of the inner exposed side of the housing 101. When the earphone 20 is worn on the right ear 510, the second touch sensor 105 will not contact the right ear 510; but when the earphone 20 is worn on the left ear 310, the second touch sensor 105 of the earphone 20 will contact the left ear 310. The microprocessor 107 of the earphone 20 would determine whether the earphone 20 is worn on the right ear 510 or is held by the user according to the sensing results of the first touch sensor 103 and the second touch sensor 105.

Figure 7:
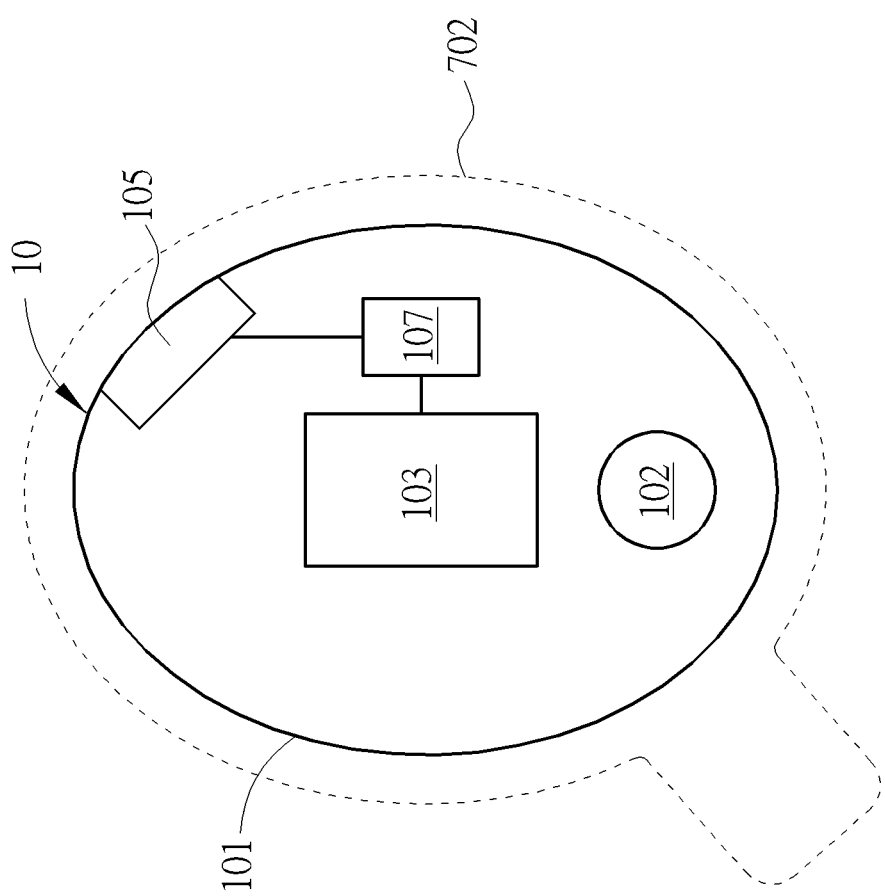
FIG. 7 is a schematic diagram of the earphone in FIG. 1 further comprising a shell.

In one embodiment, the housing 101 of the earphone 10 may have a shell 702 to cover the earphone 10, as shown in FIG. 7. The shell 702 wraps the first touch sensor 103, the second touch sensor 105, the third touch sensor 106, and the microprocessor 107. The shell 702 can make the earphone 10 more beautiful, and can hide the first touch sensor 103, the second touch sensor 105, the third touch sensor 106, and the microprocessor 107. Since the touch sensors in the embodiment could be capacitive touch sensors, they will not affect the touch function of the earphone 10, and the shell 702 can be changed in different shapes or colors to increase product variety.

Figure 8:
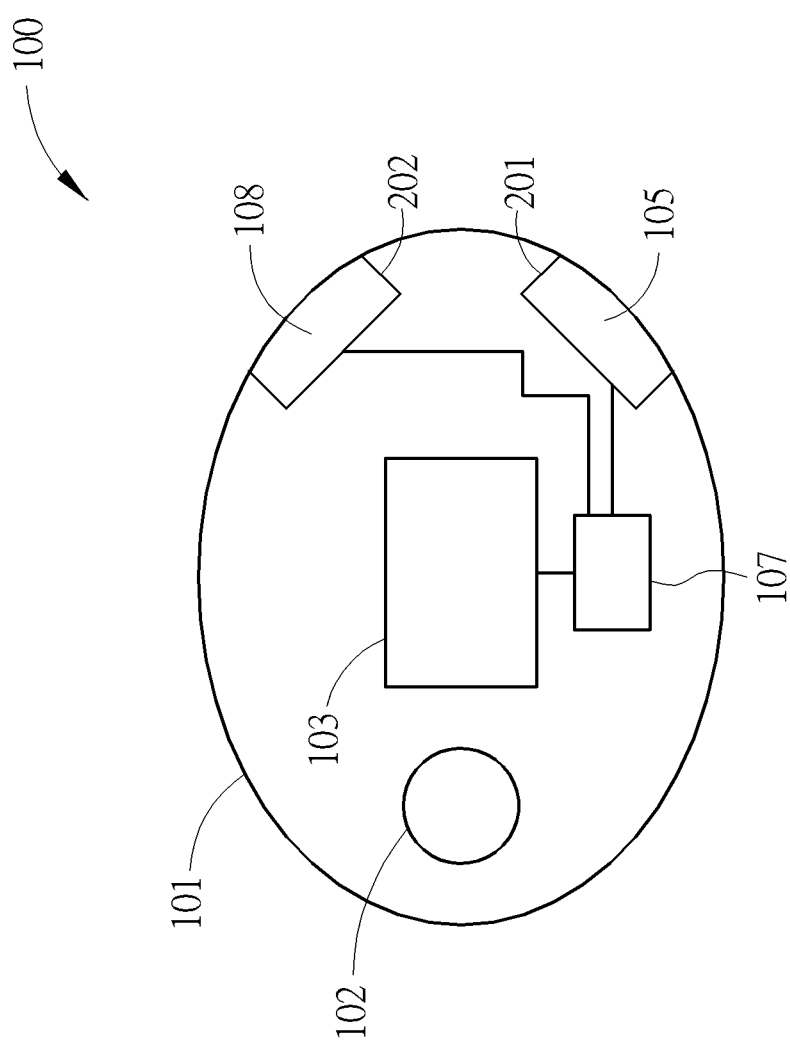
FIG. 8 is a schematic diagram of the inner exposed side of an earphone according to another embodiment of the present invention.
Figure 9:
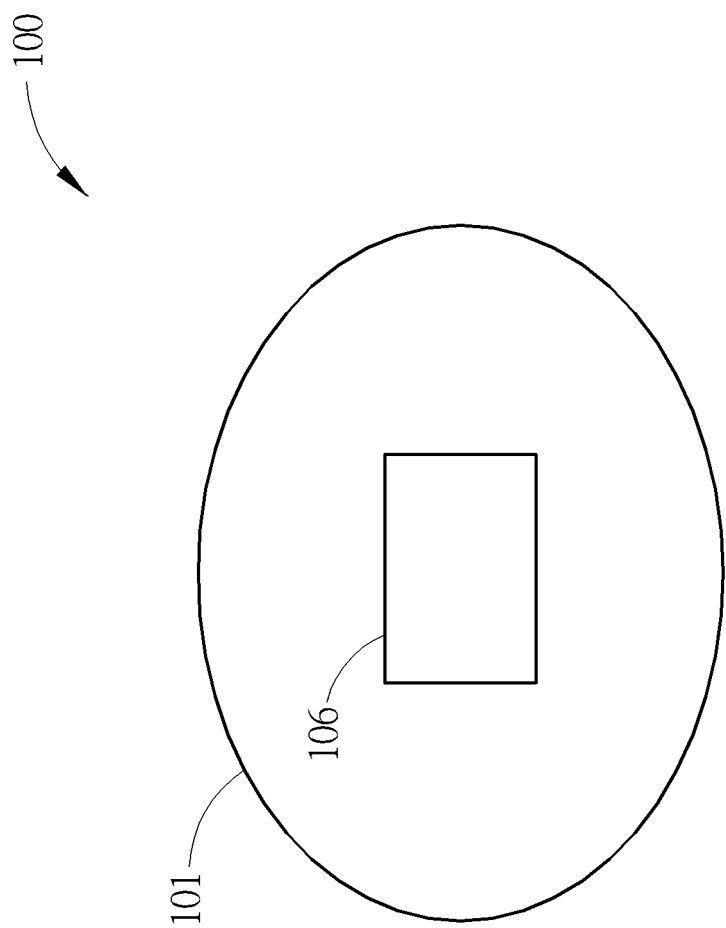
FIG. 9 is a schematic diagram of the outer exposed side of the earphone in FIG. 8.
Figure 10:
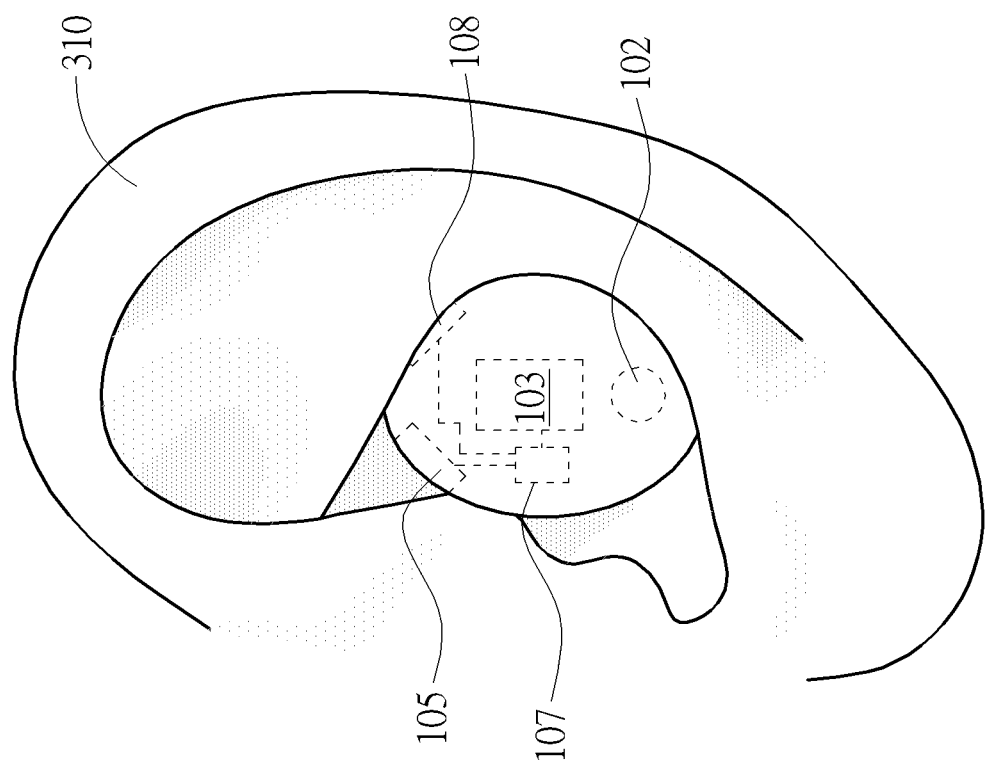
FIG. 10 is a schematic diagram of the earphone in FIG. 8 when it is worn on the left ear.

In another embodiment of the present invention, the earphone may further comprise a fourth touch sensor 108 for use with the first touch sensor 103, so that the microprocessor 107 would determine whether the earphone 10 is worn on the left ear 310 according to sensing results of the first touch sensor 103 and the fourth touch sensor 108, determine whether the earphone 10 is held in hand according to a sensing result of the second touch sensor 105, and provide the corresponding control function according to the sensing result of the third touch sensor 106. Please refer to FIG. 8 to FIG. 10. FIG. 8 is a schematic diagram of the inner exposed side of an earphone 100 according to another embodiment of the present invention, FIG. 9 is a schematic diagram of the outer exposed side of the earphone 100, and FIG. 10 is a schematic diagram of the earphone 100 worn on the left ear 310. The earphone 100 comprises the housing 101, the sound output hole 102, the first touch sensor 103, the second touch sensor 105, the third touch sensor 106, a fourth touch sensor 108, and the microprocessor 107. The fourth touch sensor 108 of the earphone 100 is installed on the second portion 202 of the edge of the inner exposed side of the housing 101. Except for the fourth touch sensor 108, the setting of other components of earphone 100 are the same as those of earphone 10, so they will not be repeated here. In one embodiment, the fourth touch sensor 108 may be a capacitive touch sensor.

The microprocessor 107 is coupled to the first touch sensor 103, the second touch sensor 105, the third touch sensor 106, and the fourth touch sensor 108, and is configured to determine whether the earphone 100 is worn on the left ear 310 according to the sensing results of the first touch sensor 103 and the fourth touch sensor 108, determine whether the earphone 100 is held in hand according to the sensing result of the second touch sensor 105, and provide the corresponding control function according to the sensing result of the third touch sensor 106.

In one embodiment, the fourth touch sensor 108 may store a fourth threshold and a fourth predetermined value. When the variation of the electric field of the fourth touch sensor 108 exceeds the fourth threshold, the fourth touch sensor 108 starts a fourth touch sensing counting, and determines whether a count value of the fourth touch sensing counting exceeds the fourth predetermined value. When the user's finger approaches or touches the fourth touch sensor 108, the microprocessor 107 determines whether the fourth touch sensor 108 is touched according to the fourth threshold. When the variation of the electric field of the fourth touch sensor 108 is greater than the fourth threshold, it means that the fourth touch sensor 108 is touched. Conversely, when the variation of the electric field of the fourth touch sensor 108 does not exceed the fourth threshold, it means that the fourth touch sensor 108 is not touched. In addition, the fourth predetermined value is used to determine the user's accidental touch behavior. When the variation of the electric field of the fourth touch sensor 108 exceeds the fourth threshold, and the count value of the fourth touch sensing counting exceeds the fourth predetermined value, it means that the user is actually touching the fourth touch sensor 108 instead of touching by mistake. When the variation of the electric field of the fourth touch sensor 108 exceeds the fourth threshold, but the count value of the fourth touch sensing counting does not exceed the fourth predetermined value, it means that the user touches the fourth touch sensor 108 by mistake.

In one embodiment, the first touch sensor 103 and the fourth touch sensor 108 would be used for in-ear detection of the earphone 100, and the second touch sensor 105 would be used for the hand-held detection of the earphone 100. As shown in FIG. 10, when the earphone 100 is worn on the left ear 310, the first touch sensor 103 and the fourth touch sensor 108 should be in contact with the left ear 310 since they are located on the inner exposed side of the housing 101 of the earphone 100. The second touch sensor 105 is still far away from the left ear 310 and should not be in contact with the left ear 310. Therefore, the microprocessor 107 can determine whether the earphone 100 is worn on the left ear 310 based on the sensing results of the first touch sensor 103, the fourth touch sensor 108, and the second touch sensor 105.

When the variation of the electric field of the first touch sensor 103 exceeds the first threshold, the first touch sensor 103 would perform the first touch sensing counting; when the variation of the electric field of the fourth touch sensor 108 exceeds a fourth threshold, the fourth touch sensor 108 would perform the fourth touch sensing counting. When the variation of the electric field of the second touch sensor 105 is less than the second threshold, the count value of the first touch sensing counting is greater than the first predetermined value, and the count value of the fourth touch sensing counting is greater than the fourth predetermined value, the microprocessor 107 would determine that the earphone 100 is worn on the left ear 310.

When the earphone 100 is turned on, the microprocessor 107 may only periodically detect the first touch sensor 103, the second touch sensor 105 and the fourth touch sensor 108. The rest of the functions of the earphone 100, such as the third touch sensor 106 and the utterance unit that consumes a lot of earphone power, would not been enabled until the earphone 100 has been worn on the left ear 310.

In addition to being an in-ear earphone, the earphone 100 may also be a head-worn earphone. When the earphone 100 is a head-worn earphone, in order to make the earphone 100 still have the above-mentioned function of judging whether it is worn on the ear or whether it is hand-held, the positions of the first touch sensor 103, the second touch sensor 105 and the fourth touch sensor 108 could be adjusted so that the first touch sensor 103 and the fourth touch sensor 108 would touch the left ear 310 and the second touch sensor 105 would not touch the left ear 310 when the earphone 100 is worn on the left ear 310, and the second touch sensor 105 is installed at a position to make the second touch sensor 105 can be touched by the user when the earphone 10 is held in hand.

Figure 11:
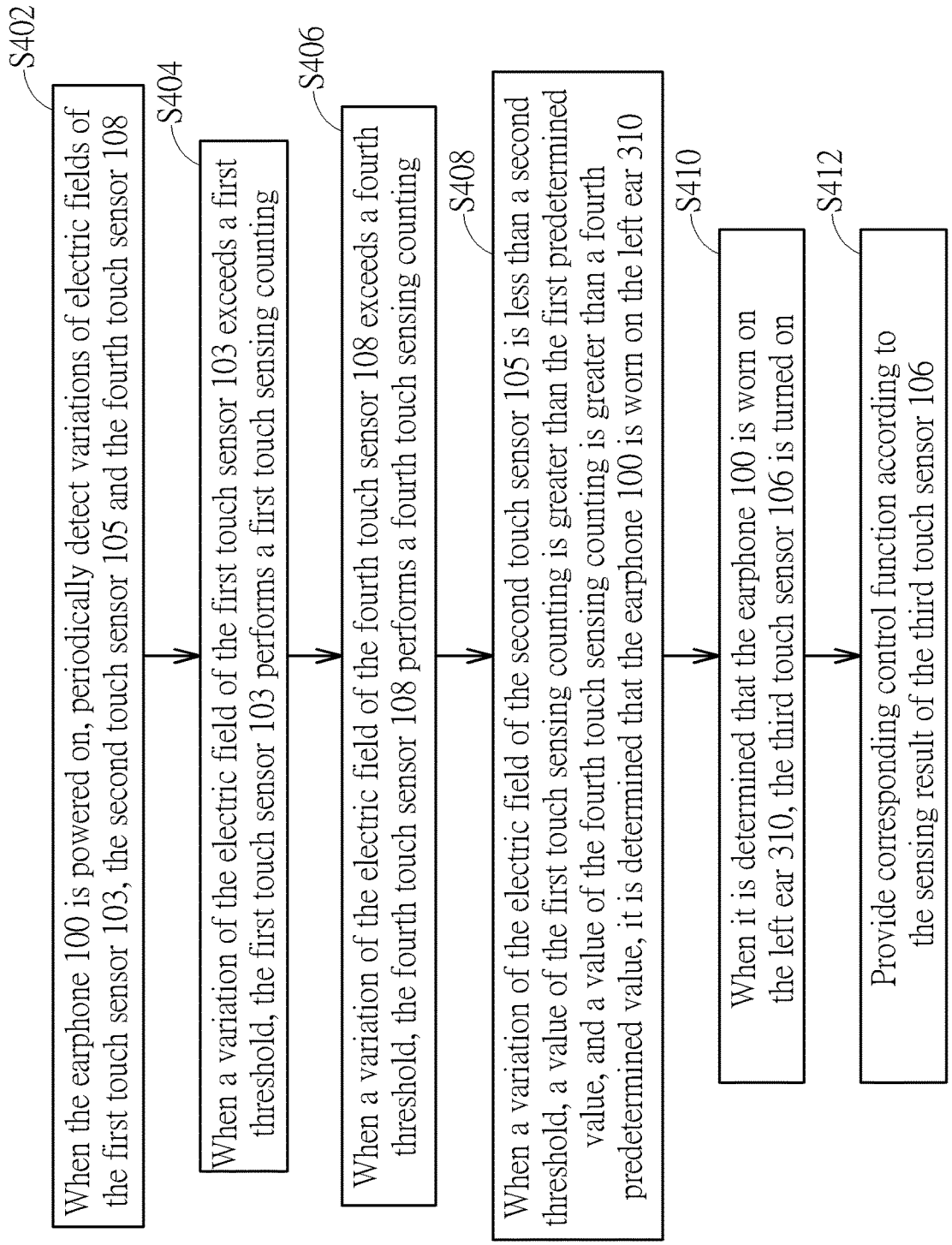
FIG. 11 is a flowchart of a method for detecting the earphone shown in FIG. 8 worn on the left ear.

FIG. 11 is a flowchart of a method for detecting the earphone 100 shown in FIG. 8 worn on the left ear 310. The method shown in FIG. 11 comprises the following steps:

Step S402: When the earphone 100 is powered on, periodically detect the variations of the electric fields of the first touch sensor 103, the second touch sensor 105 and the fourth touch sensor 108;

Step S404: When the variation of the electric field of the first touch sensor 103 exceeds the first threshold, the first touch sensor 103 performs the first touch sensing counting;

Step S406: When the variation of the electric field of the fourth touch sensor 108 exceeds the fourth threshold, the fourth touch sensor 108 performs the fourth touch sensing counting;

Step S408: When the variation of the electric field of the second touch sensor 105 is less than the second threshold, the count value of the first touch sensing counting is greater than the first predetermined value, and the count value of the fourth touch sensing counting is greater than the fourth predetermined value, it is determined that the earphone 100 is worn on the left ear 310;

Step S410: When it is determined that the earphone 100 is worn on the left ear 310, turn on the third touch sensor 106; and Step S412: Provide a corresponding control function according to the sensing result of the third touch sensor 106.

In step S402, when the earphone 100 is powered on, in order to achieve the best battery power consumption management, only the variations of the electric fields of the first touch sensor 103, the second touch sensor 105 and the fourth touch sensor 108 are periodically detected. Only when it is determined that the earphone 100 is worn on the left ear 310, the other components of earphone 100 are turned on. In step S404, when the first touch sensor 103 performs the first touch sensing counting, if the variation of the electric field of the first touch sensor 103 is less than the first threshold at this time, the first touch sensing counting of the first touch sensor 103 is stopped and reset. Similarly, when the fourth touch sensor 108 performs the fourth touch sensing counting, if the variation of the electric field of the fourth touch sensor 108 is less than the fourth threshold at this time, the fourth touch sensing counting is stopped and reset. Step S402 is the main step for determining whether the earphone 100 is held in hand or worn on the left ear 310. The first touch sensor 103 and the fourth touch sensor 108 are used for in-ear detection, and the second touch sensor 105 is used for hand-held detection. As shown in FIG. 11, when the earphone 100 is worn on the left ear 310, due to the shape of the left ear 310, the second touch sensor 105 still has a distance from and will not be in direct contact the left ear 310 after the earphone 100 is worn on the left ear 310.

Figure 12:
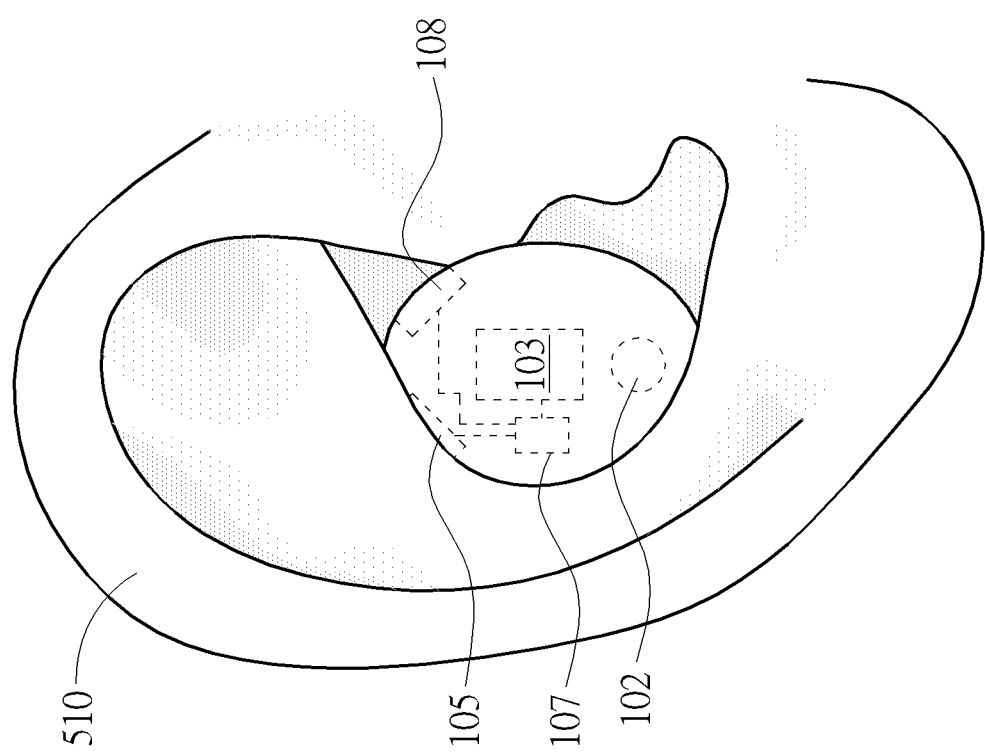
FIG. 12 is a schematic diagram of the earphone in FIG. 8 when it is worn on the right ear.
Figure 13:
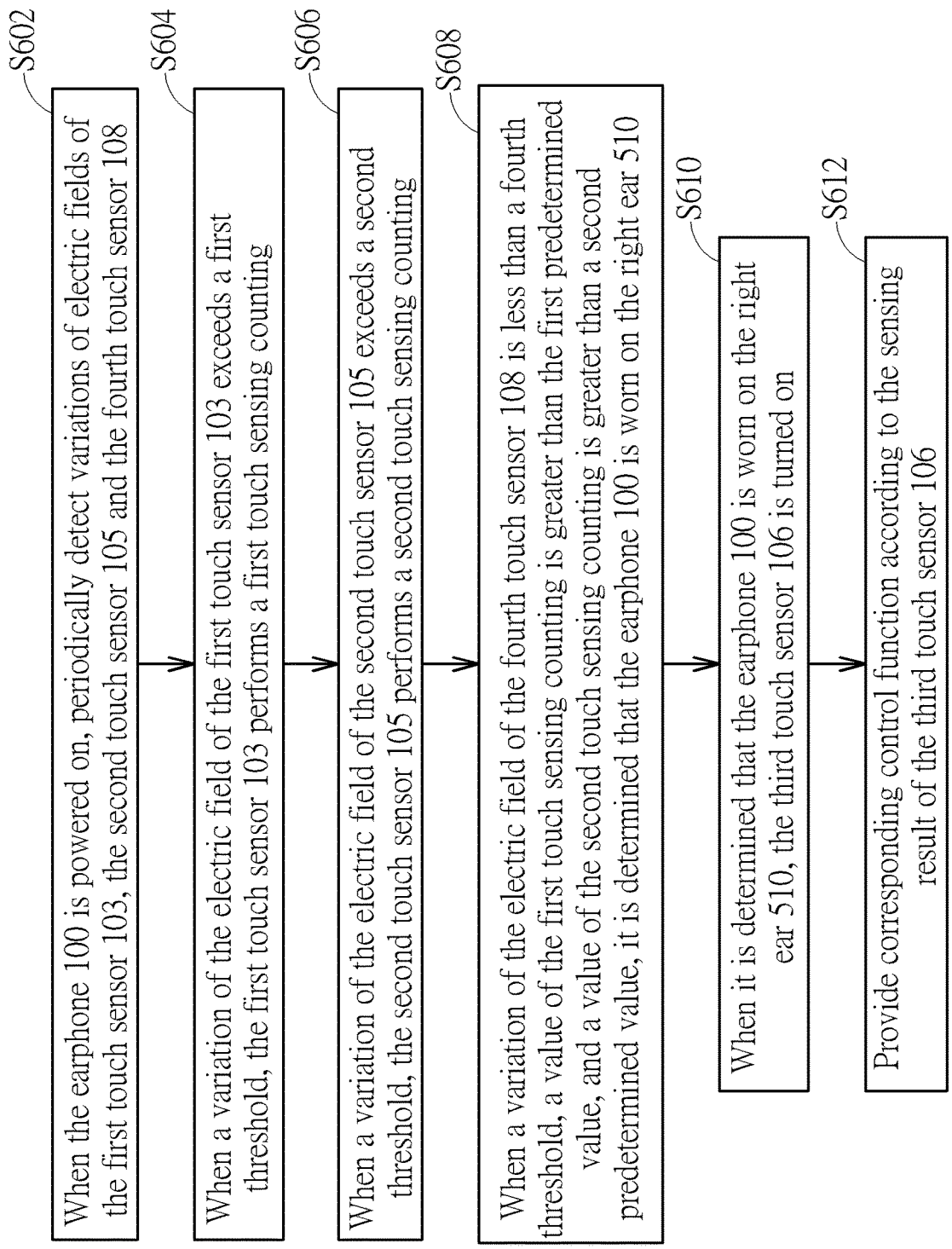
FIG. 13 is a flowchart of a method for detecting the earphone shown in FIG. 8 worn on the right ear.

FIG. 12 is a schematic diagram of the earphone 100 in FIG. 8 when it is worn on the right ear 510. The earphone 10 in FIG. 12 is shown in a perspective view, which mainly shows the contact points between the right ear 510 and the touch sensors installed on the inner exposed side of the earphone 100. As shown in FIG. 12, due to the shape of the right ear 510, the fourth touch sensor 108 will have a distance from and will not be in direct contact the right ear 510 after the earphone 100 is worn on the right ear 510, while the first touch sensor 103 and the second touch sensor 105 Will contact the right ear 510. In one embodiment, a software setting method would be used to set whether the earphone 100 is dedicated to be worn on the left ear 310 or the right ear 510. That is, if the earphone 100 is dedicated to be worn on the left ear 310, the detection method in FIG. 11 may be used to determine whether the earphone 100 is worn on the left ear 310. If the earphone 100 is dedicated to be worn on the right ear 510, the detection method in FIG. 13 may be used to determine whether the earphone 100 is worn on the right ear 510. The advantage of using the software setting is that users would more conveniently decide whether to wear the earphone 100 on the left ear 310 or the right ear 510 without changing the hardware structure. The method shown in FIG. 13 comprises the following steps:

Step S602: When the earphone 100 is powered on, periodically detect the variations of the electric fields of the first touch sensor 103, the second touch sensor 105 and the fourth touch sensor 108;

Step S604: When the variation of the electric field of the first touch sensor 103 exceeds the first threshold, the first touch sensor 103 performs the first touch sensing counting;

Step S606: When the variation of the electric field of the second touch sensor 105 exceeds the second threshold, the second touch sensor 105 performs the second touch sensing counting;

Step S608: When the variation of the electric field of the fourth touch sensor 108 is less than the fourth threshold, the count value of the first touch sensing counting is greater than the first predetermined value, and the count value of the second touch sensing counting is greater than the second predetermined value, it is determined that earphone 100 is worn on right ear 510;

Step S610: When it is determined that the earphone 100 is worn on the right ear 510, turn on the third touch sensor 106; and Step S612: Provide a corresponding control function according to the sensing result of the third touch sensor 106.

Figure 14:
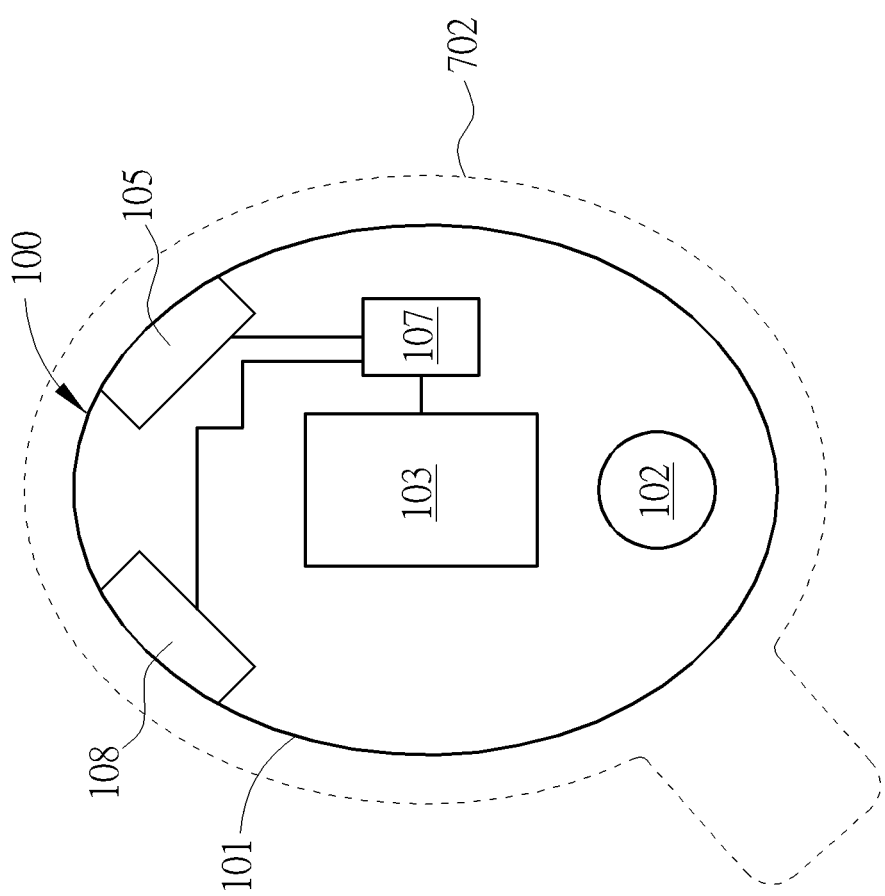
FIG. 14 is a schematic diagram of the earphone in FIG. 8 further comprising a shell.

In one embodiment, the housing 101 of the earphone 100 may have a shell 702 to cover the earphone 100, as shown in FIG. 14. The shell 702 wraps the first touch sensor 103, the second touch sensor 105, the third touch sensor 106, the fourth touch sensor 108, and the microprocessor 107.

This embodiment provides an earphone and earphone wearing detection method. The first touch sensor 103 and the second touch sensor 105 are installed on the inner exposed side of the housing 101 of the earphone 100 to determine whether the earphone is worn on the ear or the earphone is held in hand. The third touch sensor 106 is installed on the outer exposed side of the housing 101 of the earphone. Only when the earphone is worn on the ear, the third touch sensor 106 is turned on to provide the earphone's touch functions such as volume control, music playback, track selection, pause, answer incoming calls and/or hang up calls, etc. When it is determined that the earphone is worn on the ear, the utterance unit of the earphone is provided with electric power, and the management of battery power consumption would be optimized. Because the third touch sensor 106 would provide earphone's touch function, it would replace physical buttons, greatly reducing the size of the earphone, increasing the internal space of the earphone, and adding more utterance units in the earphone to improve the sound quality of the earphone. When the user takes the earphone from the ear, it is detected that the earphone is held in hand based on the sensing result of the second touch sensor 105, and the utterance unit is commanded to stop playing so as to reduce power consumption. Using touch sensors instead of physical buttons would keep the earphone airtight, reduce the chance of dust entering and increase water resistance. Compared with the use of infrared detection sensor, the housing of earphone could be made of light-transmitting material, which increases product diversity. Moreover, the user may use the software to set the earphone to be worn on the left ear 310 or the right ear 510, which increases the convenience of use.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An earphone, comprising:
   a housing;
   a sound output hole formed on an inner exposed side of the housing;
   a first touch sensor installed on the inner exposed side of the housing;
   a second touch sensor installed on a first portion of an edge of the inner exposed side of the housing;
   a third touch sensor installed on an outer exposed side of the housing; and
   a microprocessor, coupled to the first touch sensor, the second touch sensor and the third touch sensor, and configured to determine whether the earphone is worn on an ear at least according to a sensing result of the first touch sensor, determine whether the earphone is held in hand according to a sensing result of the second touch sensor, and provide a corresponding control function according to a sensing result of the third touch sensor.

2. The earphone of claim 1, wherein when a variation of an electric field of the second touch sensor exceeds a second threshold, the second touch sensor performs a second touch sensing counting.

3. The earphone of claim 2, wherein when a count value of the second touch sensing counting is greater than a second predetermined value, the microprocessor determines that the earphone is held in hand.

4. The earphone of claim 1, further comprising:
   a fourth touch sensor installed on a second portion of the edge of the inner exposed side of the housing;
   wherein the microprocessor determines whether the earphone is worn on the ear according to the sensing result of the first touch sensor and a sensing result of the fourth touch sensor.

5. The earphone of claim 4, wherein the first touch sensor performs a first touch sensing counting when a variation of an electric field of the first touch sensor exceeds a first threshold, and the fourth touch sensor performs a fourth touch sensing counting when a variation of an electric field of the fourth touch sensor exceeds a fourth threshold.

6. The earphone of claim 5, wherein when a variation of an electric field of the second touch sensor is less than a second threshold, a count value of the first touch sensing counting is greater than a first predetermined value, and a count value of the fourth touch sensing counting is greater than a fourth predetermined value, the microprocessor determines that the earphone is worn on the ear.

7. The earphone of claim 1, wherein when the microprocessor determines that the earphone is worn on the ear, the microprocessor turns on the third touch sensor to provide the corresponding control function according to the sensing result of the third touch sensor.

8. The earphone of claim 1, wherein the first touch sensor, the second touch sensor and the third touch sensor are capacitive touch sensors.

9. The earphone of claim 1 being a Bluetooth earphone or a wired earphone.

10. The earphone of claim 1, wherein the first touch sensor is installed near a center of the inner exposed side of the housing.

11. A method for detecting earphone wearing, comprising:
    when an earphone is powered on, periodically detecting variations of electric fields of a first touch sensor, a second touch sensor, and a third touch sensor of the earphone;
    when a variation of the electric field of the first touch sensor exceeds a first threshold, the first touch sensor performing a first touch sensing counting;
    when a variation of the electric field of the second touch sensor is less than a second threshold, and a count value of the first touch sensing counting is greater than a first predetermined value, determining that the earphone is worn on an ear;
    when it is determined that the earphone is worn on the ear, turning on the third touch sensor; and
    providing a corresponding control function according to a sensing result of the third touch sensor.

12. The method of claim 11, further comprising the second touch sensor performing a second touch sensing counting when the variation of the electric field of the second touch sensor exceeds the second threshold.

13. The method of claim 12, further comprising determining that the earphone is held in hand when a count value of the second touch sensing counting is greater than a second predetermined value.

14. The method of claim 11, further comprising:
    when it is determined that the earphone is worn on the ear, providing electric power to at least an utterance unit of the earphone.

15. The method of claim 11, wherein providing the corresponding control function according to the sensing result of the third touch sensor comprising controlling volume of the earphone, playing music, selecting a music track, pausing, answering an incoming call and hanging up a call according to the sensing result of the third touch sensor.

16. A method for detecting earphone wearing, comprising:
    when an earphone is powered on, periodically detecting variations of electric fields of a first touch sensor, a second touch sensor, a third touch sensor, and a fourth touch sensor of the earphone;

when a variation of the electric field of the first touch sensor exceeds a first threshold, the first touch sensor performing a first touch sensing counting;

when a variation of the electric field of the fourth touch sensor exceeds a fourth threshold, the fourth touch sensor performing a fourth touch sensing counting;

when a variation of the electric field of the second touch sensor is less than a second threshold, a count value of the first touch sensing counting is greater than a first predetermined value, and a count value of the fourth touch sensing counting is greater than a fourth predetermined value, determining that the earphone is worn on an ear;

when it is determined that the earphone is worn on the ear, turning on the third touch sensor; and providing a corresponding control function according to the sensing result of the third touch sensor.

17. The method of claim 16, further comprising the second touch sensor performing a second touch sensing counting when the variation of the electric field of the second touch sensor exceeds the second threshold.

18. The method of claim 17, further comprising determining that the earphone is held in hand when a count value of the second touch sensing counting is greater than a second predetermined value.

19. The method of claim 16, further comprising:
when it is determined that the earphone is worn on the ear, providing electric power to at least an utterance unit of the earphone.

20. The method of claim 16, wherein providing the corresponding control function according to the sensing result of the third touch sensor comprising controlling volume of the earphone, playing music, selecting a music track, pausing, answering an incoming call and hanging up a call according to the sensing result of the third touch sensor.

* * * * *